United States Patent
Kato et al.

(10) Patent No.: US 11,283,299 B2
(45) Date of Patent: Mar. 22, 2022

(54) WIRELESS POWER SUPPLY SYSTEM AND WIRELESS POWER TRANSMISSION DEVICE

(71) Applicant: TOSHIBA TEC KABUSHIKI KAISHA, Tokyo (JP)

(72) Inventors: Masakazu Kato, Numazu Shizuoka (JP); Sadatoshi Oishi, Fuji Shizuoka (JP); Takuya Ogishima, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/917,754

(22) Filed: Jun. 30, 2020

(65) Prior Publication Data

US 2021/0075260 A1 Mar. 11, 2021

(30) Foreign Application Priority Data

Sep. 10, 2019 (JP) .............................. JP2019-164891

(51) Int. Cl.
*H02J 50/12* (2016.01)
*H02J 7/02* (2016.01)
*H02J 7/00* (2006.01)
*H02J 50/40* (2016.01)
*H02J 50/90* (2016.01)
(Continued)

(52) U.S. Cl.
CPC .............. *H02J 50/12* (2016.02); *B60L 53/12* (2019.02); *B60L 53/30* (2019.02); *H02J 7/0047* (2013.01); *H02J 7/02* (2013.01); *H02J 50/40* (2016.02); *H02J 50/90* (2016.02); *H02J 50/80* (2016.02)

(58) Field of Classification Search
None
See application file for complete search history.

(56) References Cited

U.S. PATENT DOCUMENTS 4,723,118 A * 2/1988 Hooley ................... A47F 9/045
186/62
5,466,915 A * 11/1995 Meier ................... A47J 39/006
219/622
(Continued)

FOREIGN PATENT DOCUMENTS

| EP | 3761481 A1 | 1/2021 |
| JP | 2006-101577 A | 4/2006 |
| JP | 2006128381 A | 5/2006 |

OTHER PUBLICATIONS

Extended European Search Report dated Feb. 1, 2021 in corresponding European Patent Application No. 20190153.5, 8 pages.

*Primary Examiner* — Rexford N Barnie
*Assistant Examiner* — Terrence R Willoughby
(74) *Attorney, Agent, or Firm* — Kim & Stewart LLP

(57) ABSTRACT

A wireless power supply system includes a power receiving device disposed on a bottom surface of a cart, a guide rail extending along a first direction for guiding wheels of carts, and a plurality of power transmission devices configured to wirelessly transmit power to the power receiving device. The power transmission devices are arranged along the guide rail at predetermined intervals. The guide rail has a plurality of recesses arranged at the predetermined intervals such that one of the power transmission devices faces the power receiving device when a wheel of the cart fits into one of the recesses.

16 Claims, 9 Drawing Sheets

FORWARD DIRECTION

(51) Int. Cl.
    *B60L 53/12*           (2019.01)
    *B60L 53/30*           (2019.01)
    *H02J 50/80*           (2016.01)

(56) References Cited

U.S. PATENT DOCUMENTS

| | | | |
|---|---|---|---|
| 10,927,873 B1* | 2/2021 | Neal | F16B 5/12 |
| 2003/0042114 A1* | 3/2003 | Iizuka | B61C 13/04 |
| | | | 198/570 |
| 2007/0182367 A1* | 8/2007 | Partovi | H02J 7/00 |
| | | | 320/108 |
| 2012/0012101 A1* | 1/2012 | Trujillo | F24S 30/452 |
| | | | 126/601 |
| 2015/0191094 A1* | 7/2015 | Maekawa | B60L 53/36 |
| | | | 307/104 |
| 2015/0362333 A1* | 12/2015 | Miller | H01M 50/342 |
| | | | 340/870.02 |
| 2015/0372498 A1* | 12/2015 | Ichikawa | H02J 50/10 |
| | | | 307/104 |
| 2016/0211695 A1* | 7/2016 | Singer | H02J 50/10 |
| 2017/0077738 A1* | 3/2017 | Park | H01F 27/36 |
| 2018/0056848 A1* | 3/2018 | Koehler | B65G 13/075 |
| 2018/0059258 A1* | 3/2018 | MacLaughlin | G01T 1/175 |
| 2018/0278099 A1* | 9/2018 | Hong | H04B 5/0037 |
| 2019/0148971 A1* | 5/2019 | Bae | H02J 50/12 |
| | | | 320/108 |
| 2019/0181671 A1* | 6/2019 | Matsukawa | H02J 7/0071 |
| 2019/0207427 A1* | 7/2019 | McNeally | H02J 50/40 |
| 2020/0122762 A1* | 4/2020 | Kato | B62B 3/1416 |
| 2020/0127498 A1 | 4/2020 | Kato et al. | |
| 2020/0198680 A1* | 6/2020 | Hagen | B62B 5/0096 |
| 2020/0244109 A1* | 7/2020 | Song | B60J 7/043 |
| 2020/0335988 A1* | 10/2020 | Minardi | H04W 76/10 |
| 2021/0194286 A1* | 6/2021 | Yamamoto | B60N 2/06 |

* cited by examiner

FORWARD DIRECTION

FORWARD DIRECTION

FORWARD DIRECTION

← FORWARD DIRECTION

WIRELESS POWER SUPPLY SYSTEM AND WIRELESS POWER TRANSMISSION DEVICE

CROSS-REFERENCE TO RELATED APPLICATIONS

This application is based upon and claims the benefit of priority from Japanese Patent Application No. 2019-164891, filed on Sep. 10, 2019, the entire contents of which are incorporated herein by reference.

FIELD

Embodiments described herein relate generally to a wireless power supply system and a wireless power transmission device.

BACKGROUND

In recent years, wireless power supply systems have been developed, which can charge batteries wirelessly. Such wireless power supply systems may be referred to as non-contact battery chargers or the like. It is known that, in wireless power transmission, alignment of antennas or coils on a power receiving side and a power transmitting side is important to achieve efficient power transmission. For example, in a system where a moving object having a power receiving coil is charged, it is necessary to precisely locate the moving object at a predetermined position where a power transmitting coil is installed.

Such a wireless power supply system is used for charging an electronic device mounted on a shopping cart operated by a customer. As described above, to charge the electronic device, it is necessary to locate the shopping cart at a predetermined stop position such that the power receiving unit of the electronic device aligns with an antenna of a power transmitting unit. However, a shopping cart is usually designed to be easily moved around on a shopping floor for customers' convenience. Thus, such design makes it difficult for the shopping cart to stop and stay at a predetermined position for wireless power transmission.

For this reason, there has been proposed a system including a guide rail and roller stoppers arranged along the rail, which guides and stops a shopping cart at a predetermined position so that the power receiving coil of the electronic device aligns with the power transmission coil. However, such a system tends to become complicated when several shopping carts are nested and stored at a designated location.

DETAILED DESCRIPTION

One or more embodiment provide a wireless power supply system and a power transmission device capable of precisely guiding several shopping carts to a location in which power transmission can be performed.

According to an embodiment, a wireless power supply system includes a power receiving device disposed on a bottom surface of a cart, a guide rail extending along a first direction for guiding wheels of carts, and a plurality of power transmission devices configured to wirelessly transmit power to the power receiving device. The power transmission devices being arranged along the guide rail at predetermined intervals. The guide rail having a plurality of recesses arranged at the predetermined intervals such that one of the power transmission devices faces the power receiving device when a wheel of the cart fit into one of the recesses.

Figure 1:
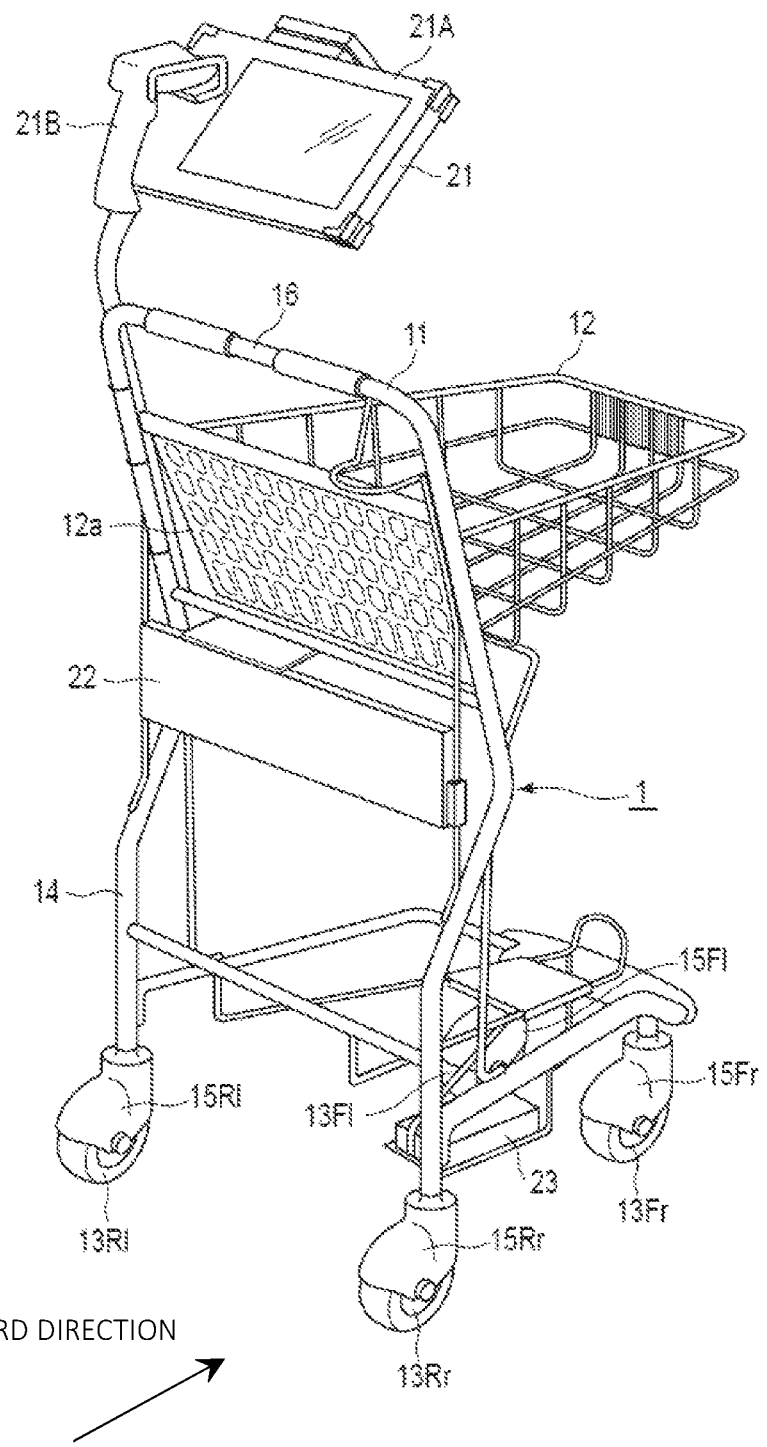
FIG. 1 is a perspective view illustrating a shopping cart equipped with an electronic device.

Hereinafter, a wireless power supply system according to an embodiment will be described with reference to the drawings. As illustrated in FIG. 1 is a perspective view illustrating a shopping cart 1 on which a wireless power supply system according to an embodiment is mounted. The wireless power supply system includes a system on a power transmission side for wirelessly transmitting power (hereinafter called the "power transmission system") and a system on a power reception side for wirelessly receiving power that has been transmitted from the power transmission system (hereinafter called the "power receiving system").

The shopping cart 1 has an electronic device than can be powered or charged by a wireless power supply system. The power receiving system is mounted on the shopping cart 1 and wirelessly receives power. For example, the power receiving system charges a battery of the electronic device mounted on the shopping cart 1 using power wirelessly received. The power transmission system transmits power that can be received by a power receiving system mounted on a shopping cart 1. For example, the power transmission system is installed at a location where the shopping cart 1 is stored.

The electronic device mounted on the shopping cart 1 operates using power supplied by the battery charged by the wireless power supply system. For example, the battery charged by the wireless power supply system may be installed in the shopping cart 1 separately from the electronic device, and may supply power to the electronic device via a wire or the like.

In the configuration example illustrated in FIG. 1, the shopping cart 1 includes an electronic device 21, a battery 22, and a power receiver 23, which are attached to a cart body 11 for storing a commodity sold at a store. The electronic device 21 is a device for providing information and services to a user. The battery 22 is a power supply device for operating the electronic device 21. The power receiver 23 receives electric power transmitted from the power transmission system. The power receiver 23 charges the battery 22 with the received electric power.

In one embodiment, the battery 22 may be installed inside the electronic device 21. In such a case, the battery 22 includes at least a battery cell and a charging circuit for charging the battery cell using the electric power received by the power receiver 23. The electric power stored in the battery cell is then supplied to the electronic device 21.

The cart body 11 has a basket 12 for storing commodities. The basket 12 is supported by a frame 14 provided with four casters 15 (15Fr, 15Fl, 15Rr, and 15Rl). The four casters 15 are provided at four corners of the lower portion of the frame 14. The casters 15 (15Fr, 15Fl, 15Rr, 15Rl) respectively include front wheels 13Fr, 13Fl and rear wheels 13Rr, 13Rl, that rotate in the moving direction. The cart body 11 moves by the wheels 13 of the casters 15 rotating on the floor surface. Further, each of the casters 15 rotates about the vertical axis so that the user can freely change the moving direction.

A handle 16 is provided on a near side of the basket 12 in the frame 14. The handle 16 can be gripped by a user. The user grips the handle 16 and moves the cart body 11. In this disclosure, a direction from the handle 16 toward the basket 12 is called the "forward direction." The front wheels 13Fr and 13Fl are guided by guide rails 31 and guide bases 32, which will be described later.

Further, the lower portions of the frame 14 in which the four casters 15 are provided at four corners are narrower on the front side and wider on the rear side in the forward direction. For this reason, the width between the casters 15Fr and 15Fl that support the front wheels 13Fr and 13Fl is a smaller than the width of the casters 15Rr and 15Rl that support the rear wheels 13Rr and 13Rl. Thereby, a plurality of shopping carts are stored in a nested manner such that the frame of the rear shopping cart is stored along the frame of the front shopping cart.

In addition, the handle 16 side of the shopping cart 1 is referred to as the "near side" and the opposite side is referred to as the "leading side" with respect to the basket 12. The basket 12 has an open/close surface 12a, the lower end of which opens and closes in the forward direction. Further, the basket 12 has a smaller surface on the leading side than the open/close surface 12a. Accordingly, when a plurality of shopping carts are stored in a nested manner, the rear shopping cart pushes up the open/close surface 12a of the front shopping cart, and those baskets 12 are overlapped each other.

The electronic device 21 is attached to the cart body 11. In the configuration example illustrated in FIG. 1, the electronic device 21 is attached to the handle 16 of the shopping cart 1. The electronic device 21 is driven by the electric power supplied from the battery 22. For example, the electronic device 21 is an information terminal such as a tablet terminal for providing information to a user or a commodity reader for acquiring information of a commodity selected by the user. Further, the electronic device 21 may be a charging device for charging a mobile terminal (such as, a mobile phone, a smartphone, a digital camera, or the like) carried by the user using the power supplied from the battery 22.

In the configuration example illustrated in FIG. 1, a tablet terminal 21A and an information reader 21B are shown as an example of the electronic device 21. The tablet terminal 21A is a computer having a display unit on which a touch panel is provided. The tablet terminal 21A is installed with the display unit facing the user located on the handle side. For example, the tablet terminal 21A displays information on a commodity read by the information reader 21B. Further, the tablet terminal 21A may be configured to perform settlement processing for commodities that have been registered by the information reader 21B.

The information reader 21B is a device for reading information about a commodity. The information reader 21B may include a display unit that displays the information on the read commodity. For example, the information reader 21B is an RFID (radio-frequency identification) tag reader that reads an RFID tag or the like attached to a commodity that is taken in or out of the basket 12. Alternatively, the information reader 21B may be a scanner that reads commodity identification information such as a barcode attached to a commodity.

As the electronic device 21, an interface device for connecting a mobile terminal (a smartphone, a tablet terminal, or the like) carried by a user may be provided in place of the tablet terminal 21A. The mobile terminal connected to the interface device operates as the electronic device 21 and performs the same processing as that of the tablet terminal 21A described above. Further, the interface device as the electronic device 21 may charge the mobile terminal. An interface device may incorporate the battery 22, or may be installed separately from the battery 22.

The power receiver 23 is attached to a bottom surface of the cart body 11. The power receiver 23 receives power wirelessly transmitted from the power transmission system, and supplies the received power to the electronic device 21 or the battery 22. The power receiver 23 includes a power receiving coil 51, a control circuit, and the like. The power receiver 23 is installed on the bottom surface of the cart body 11 so that a power receiving surface for receiving power by the power receiving coil 51 is parallel to the floor surface on which a power transmitting coil of the power transmission system is disposed. The configuration of the control system of the power receiver 23 will be described later in detail.

The power receiver 23 is installed on the bottom surface of the cart body 11 so as to receive power transmitted from below the cart body 11. According to the configuration shown in FIG. 1, the power receiver 23 can receive electric power output from a power transmission coil 43 installed on an upper surface of a power transmission base 30. The position at which the power receiver 23 is provided may be designed in accordance with the arrangement of a power transmitter 40 including the power transmission coil 43 disposed so as to face the power receiver coil 51.

As discussed later with reference to FIGS. 5 and 6, a brush 24 is attached to an end face in the forward direction of the power receiver 23. The lower end of the brush 24 slides on an upper surface of the guide base 32.

Next, a configuration of the wireless power supply system for charging the battery 22 mounted on the shopping cart 1 will be described.

Figure 2:
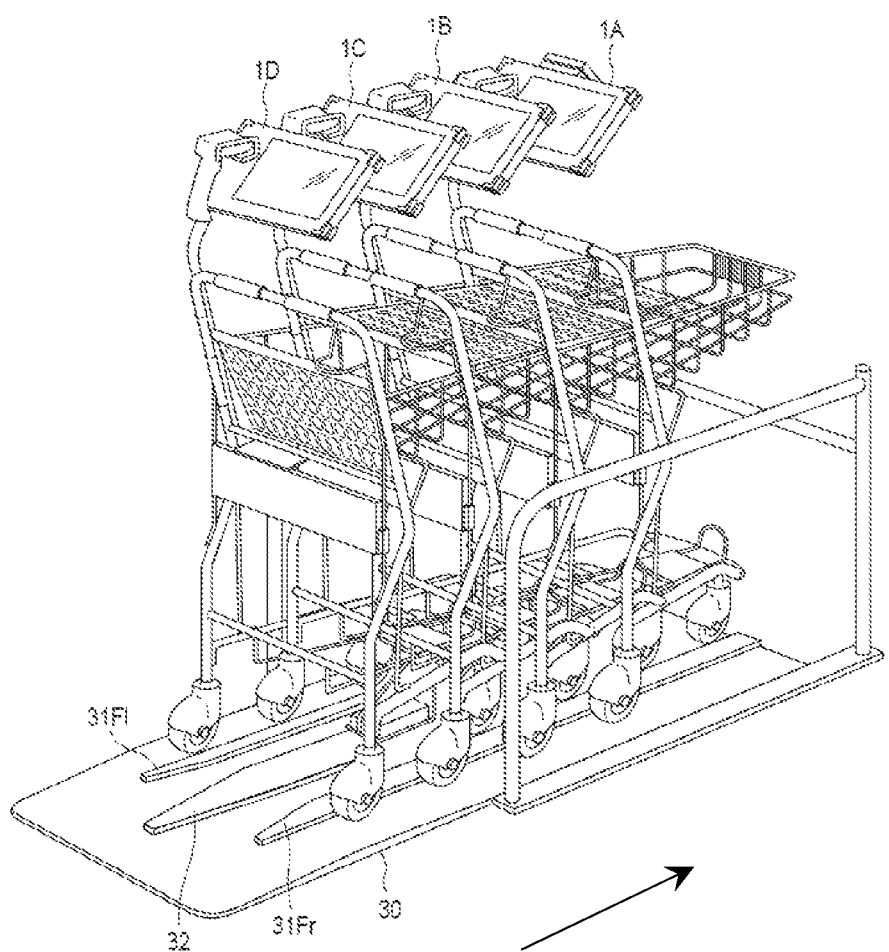
FIG. 2 is a perspective view illustrating shopping carts that are stored in a nested manner.

FIG. 2 is a perspective view illustrating shopping carts 1A-1D that are stored in a nested manner. As shown in FIG. 2, each shopping cart 1A, 1B, 1C, and 1D on which the battery 22 is mounted is stored in a nested manner at a predetermined storage position.

In the storage position, the power transmission base 30 installed on the floor surface is disposed. The power transmission base 30 includes two guide rails 31 (31Fl, 31Fr) for guiding the left and right front wheels 13Fl, 13Fr and the guide base 32 between the two guide rails 31. The guide rails 31 guide each shopping cart 1 to the storage position.

Figure 3:
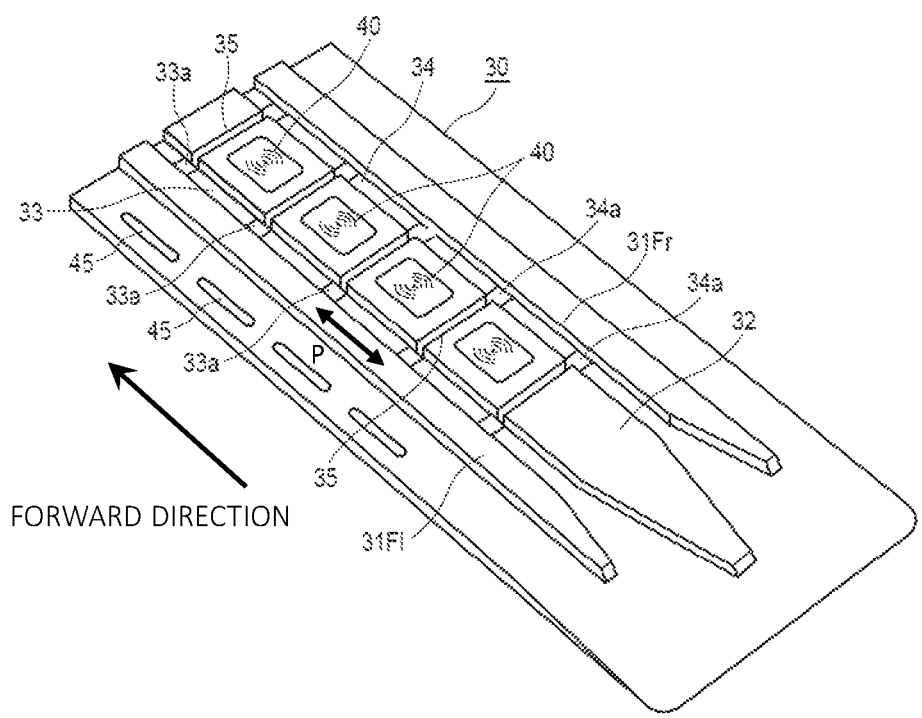
FIG. 3 is a perspective view illustrating a power transmission device in a wireless power supply system according to an embodiment.

As shown in FIG. 3, the guide base 32 guides the left front wheel 13Fl along a guide path 33 formed between the guide rail 31fl and the guide base 32, and guides the right front wheel 13fr along a guide path 34 formed between the guide rail 31*fr* and the guide base 32. Each of the guide paths 33 and 34 may be a groove formed on the floor surface.

The guide path 33 has a plurality of recesses 33*a* at predetermined pitches P. The guide path 34 has a plurality of recesses 34*a* at predetermined pitches. The front wheels 13Fl are engaged with the recesses 33*a*, and the front wheels 13Fr are engaged with the recesses 34*a*. The positions at which the recesses 33*a* and 34*a* are set will be described later.

Figure 5:
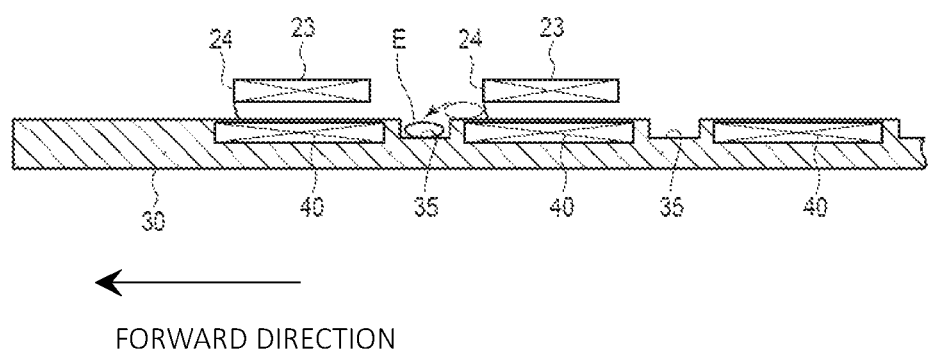
FIG. 5 is a diagram illustrating a relationship between a brush and a groove in a wireless power supply system according to an embodiment.

As shown in FIGS. 3 and 5, a power transmitter 40 is embedded in the guide base 32 at a predetermined pitch P. Furthermore, the guide base 32 has grooves 35 spaced from each other along the traveling direction of the shopping cart 1 each groove 35 extending perpendicular to the traveling direction.

In the storage position, the wheels 13 of the shopping carts 1 move along the guide rails 31, and the shopping carts 1 are stored such that the adjacent shopping carts are nested. On the near side, the basket 12 of the shopping cart 1 has the open/close surface 12*a*, the lower end of which can open and close. Further, on the leading side, the basket 12 has the surface smaller than the open/close surface 12*a*. As a result, when the leading side of the basket 12 of the rear shopping cart 1B is pushed against the open/close surface 12*a* of the front shopping cart 1A, the open/close surface 12*a* of the front shopping cart opens toward the forward direction. When the rear shopping cart 1B further is pushed towards the forward direction, the leading side of the basket 12 of the rear shopping cart 1B reaches the center of the basket 12 of the front shopping cart 1A, and those two shopping carts are stored in a nested manner.

Further, the frame 14 of each shopping cart 1 is formed so that the near side is wider and the leading side is narrower. For this reason, the width between the casters 15Fr, 15Fl that support the front wheels 13Fr, 13Fl of the shopping cart 1 is smaller than the width between the casters 15Rr, 15Rl that support the rear wheels 13Rr, 13Rl. Accordingly, at the storage position, the frame 14 of the rear shopping cart 1B overlaps with the frame 14 of the front shopping cart 1A, and thus two or more shopping carts are stored in a nested manner.

The power transmitter 40 wirelessly transmits power that can be received by the power receiver 23. The power transmitter 40 includes the power transmission coil 43 for power transmission, a circuit for power transmission, and the like. The power transmitter 40 is installed toward the bottom surface of the shopping cart body 11 such that a power transmission surface (a surface facing the power receiving coil 51 of the power receiver) for outputting power from the power transmission coil 43 is parallel to the floor surface.

Furthermore, the power transmitter 40 is provided at a position facing the power receiver 23 of each shopping cart 1 stored in the storage position. In the configuration example shown in FIG. 2, the power receivers 23 of the shopping carts 1 stored in the storage position are arranged at predetermined pitches P along the guide rails 31. Therefore, the power transmitters 40 are arranged at the predetermined pitches P along the guide rail 31 so as to face the power receivers 23 of the shopping carts 1. The pitch P is the same as the pitch P at which the recesses 33*a* and 34*a* are provided. That is, when the power transmitter 40 and the power receiver 23 face each other, the front wheels 13Fl are engaged with the recesses 33*a* and the front wheels 13Fr are engaged with the recesses 34*a*.

In general, a nested state of shopping carts depends on the shapes of the frame and the basket. However, the distances between the shopping carts is not always identical. According to the above-described structure, the front wheels 13Fl and 13Fr of the shopping cart 1 are engaged with the recesses 33*a* and 34*a*, and the front and rear shopping carts are stored in a nested manner, and thus the interval between the front and rear shopping carts 1 becomes a predetermined distance. That is, in the storage position, the power receiver 23 of each shopping cart 1 will be correctly positioned to face the power transmitter 40.

Next, the configuration of the control system of the wireless power supply system will be described.

The wireless power supply system includes the power receiving system including the power receiver 23 installed in the shopping cart 1, and the power transmission system including the power transmitter 40 installed corresponding to the storage position of the shopping cart 1. That is, in the wireless power supply system, the power transmitter 40 is installed in correspondence with the position of the shopping cart in the storage position, and wirelessly transmits power to the power receiver 23 installed in the shopping cart. In the wireless power supply system, the power transmitter 40 of the power transmission system wirelessly transmits power without being physically and electrically connected to the power receiver 23 of the power receiving system. The transmission method is, for example, a magnetic field resonance method, which is a magnetic field coupling method and in which power transmission can be performed at about 10 mm to 20 mm between the power transmitter 40 and the power receiver 23.

Figure 4:
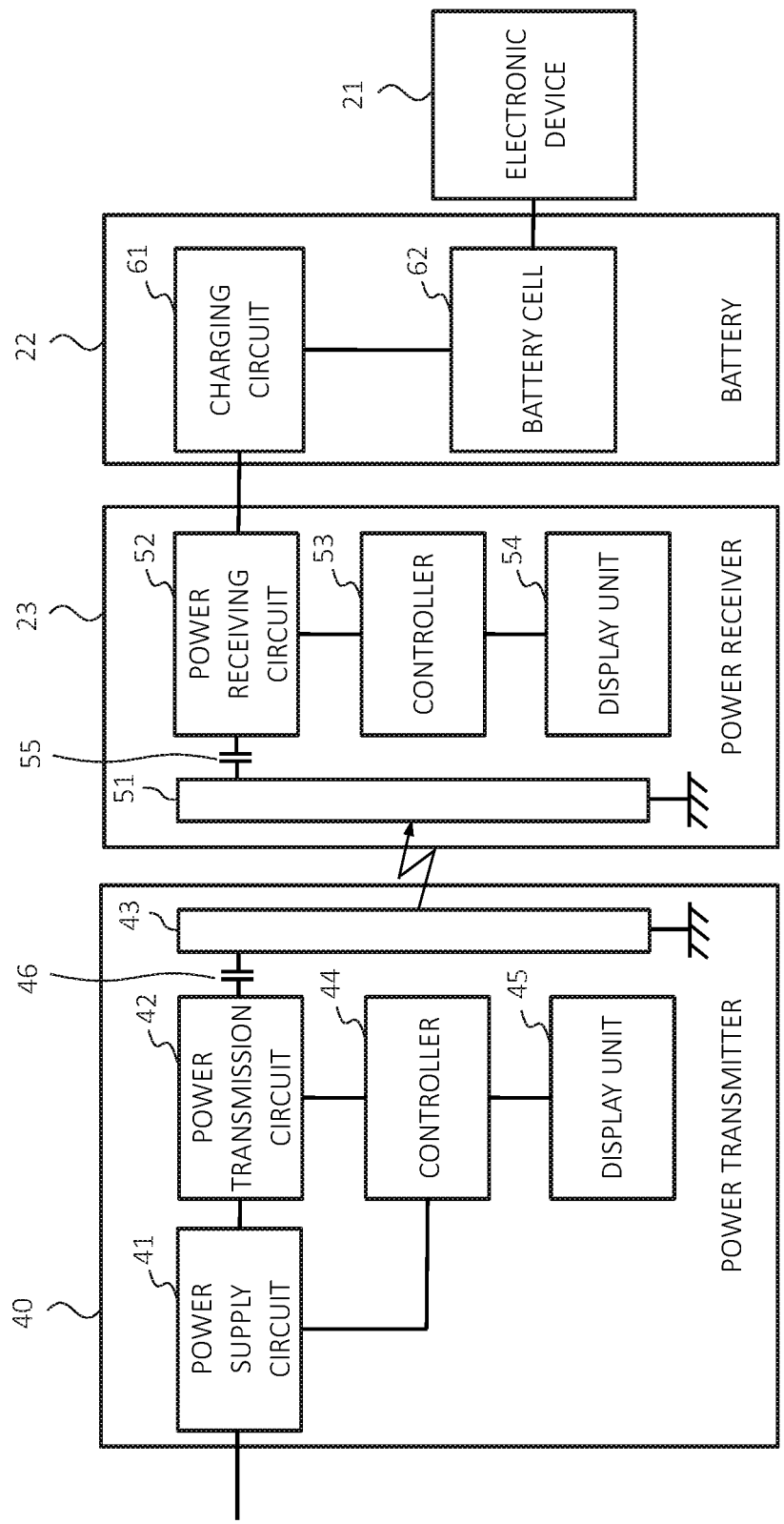
FIG. 4 is a hardware block diagram of a wireless power supply system according to an embodiment.

FIG. 4 is a hardware block diagram of a wireless power supply system.

The wireless power supply system wirelessly transmits power and includes a system on a power transmission side (i.e., the power transmission system) and a system on a power reception side (i.e., the power receiving system). The power transmission system is a system for wirelessly transmitting power to the power receiver 23 mounted in the shopping cart 1 stored in the storage position. The power receiving system is a system in which the power receiver 23 wirelessly receives power and charges the battery 22 with the received power.

The power transmission system includes the power transmission base 30 installed on the floor surface. The power transmission base 30 includes the power transmitters 40 installed along the guide rails 31 in the storage position for the shopping carts 1. The power transmitter 40 is powered by DC power supplied from, for example, an AC adaptor connected to a commercial power supply. The power transmitter 40 operates in one of a power transmission state in which power is supplied to the power receiver 23 and a standby state in which power is not supplied to the power receiver 23.

In the configuration illustrated in FIG. 4, each power transmitter 40 included in the power transmission system includes a power supply circuit 41, a power transmission circuit 42, a power transmission coil 43, a controller 44, a display unit 45, a resonance capacitor 46, and the like. The power transmission coil 43 and the resonance capacitor 46 are connected in series or in parallel.

The power supply circuit 41 converts the voltage of the DC power supply from the outside into a voltage suitable for the operation of each circuit. The power supply circuit 41 generates power and supplies the power to the power transmission circuit 42. Further, the power supply circuit 41 generates power and supplies the power to the controller 44.

The power transmission circuit 42 generates transmission power for transmitting power from the power transmission coil 43. The power transmission circuit 42 supplies the generated power transmission power to the power transmission coil 43. For example, based on the control of the controller 44, the power transmission circuit 42 generates AC power as the transmission power by switching the DC power supplied from the power supply circuit 41.

The power transmission coil 43 outputs the power that can be received by the power receiver 23 in accordance with the power transmitted from the power transmission circuit 42. The power transmission coil 43 is formed in a planar shape with a power transmission surface for transmitting electric power. The power transmission surface of the power transmission coil 43 is disposed so as to face the power receiving surface of the power receiving coil 51 of the power receiver 23 in a state of being parallel to the floor surface.

For example, the power transmission coil 43 operates as a power transmission resonance circuit by being connected in series or in parallel to the resonance capacitor 46. When the AC power is supplied from the power transmission circuit 42, the power transmission coil 43 as the power transmission resonance circuit generates a magnetic field corresponding to the supplied AC power. The power transmission coil 43 may have a winding structure in which an insulated wire is wound, or may be a coil pattern formed on a printed circuit board.

The display unit 45 is an indicator that indicates a state of the power transmitter 40. The display unit 45 switches the display in accordance with the control of the controller 44. For example, the display unit 45 switches the display color in accordance with the operation state of the power transmitter 40. Further, the display unit 45 may display a message indicating the operation state.

The controller 44 controls the operation of the power transmission circuit 42 and the display unit 45. The controller 44 includes a processor and a memory. The processor executes an arithmetic processing. The processor performs various types of processing according to a program(s) stored in the memory. The memory stores data used by the processor executing the program(s). The controller 44 may be a microcomputer, an oscillation circuit, and the like.

For example, the controller 44 switches the display of the display unit 45 in accordance with the state of the power transmitter 40. Further, the controller 44 controls the frequency of the AC power output from the power transmission circuit 42 and the ON/OFF of the operation of the power transmission circuit 42. For example, the controller 44 controls the power transmission circuit 42 to switch between a state in which the power transmission coil 43 generates a magnetic field (i.e., the power transmission state) and a state in which a magnetic field is not generated in the power transmission coil 43 (i.e., the standby state). Further, the controller 44 may control the power transmission circuit 42 to intermittently generate a magnetic field in the power transmission coil 43 in order to change the power to be transmitted.

The power transmitter 40 may have a wireless communication circuit for performing wireless communication. For example, the wireless communication circuit is a circuit that performs wireless communication at a frequency different from the frequency of the power transmission. The controller 44 may control each unit by performing wireless communication with the power receiver 23 via the wireless communication circuit. The wireless communication circuit may perform wireless communication at the same frequency as the frequency of the power transmission by utilizing a known load modulation technique.

The power receiving system includes the power receiver 23 and the battery 22 mounted on each shopping cart 1. The power receiver 23 includes a power receiving coil 51, a power receiving circuit 52, a controller 53, and a display unit 54. The battery 22 also includes a charging circuit 61 and at least one battery cell 62. Additionally, the power receiver 23 may include an output terminal for supplying power to the electronic device 21. In such a case, the battery 22 may be charged by electric power supplied through the electronic device 21.

The power receiving coil 51 receives the power transmitted from the power transmission coil 43, and supplies the received power to the power receiving circuit 52. The power receiving coil 51 has a planar shape in which a power receiving surface for receiving power is formed. The power receiving surface of the power receiving coil 51 is installed on the bottom surface of the cart body 11 in a state parallel to the floor surface.

For example, the power receiving coil 51 operates as a power receiving resonance circuit by being connected in series or in parallel to the resonance capacitor 55 for power reception. When the power receiving coil 51 as the power receiving resonance circuit is moved close to the power transmission coil 43 of the power transmitter 40, the power receiving coil 51 is electromagnetically coupled to the power transmission coil 43. The power receiving coil 51 generates an induced current by the magnetic field output from the power transmission coil 43 of the power transmitter 40. The power receiving coil 51 may have a winding structure in which an insulated wire is wound, or may be a coil pattern formed on a printed circuit board.

The power receiving coil 51 serving as the power receiving resonance circuit supplies the received AC power to the power receiving circuit 52. In other words, the power receiving coil 51 functions as an AC power supply when receiving the AC power from the power transmitter 40. In addition, when the magnetic field resonance method is used for power transmission, the self-resonance frequency of the power reception resonance circuit (i.e., the power reception coil 51) is substantially the same as the frequency transmitted by the power transmitter 40. As a result, the power transmission efficiency in the case where the power receiving coil 51 and the power transmission coil 43 are electromagnetically coupled to each other is improved.

The power receiving circuit 52 converts the received power supplied from the power receiving coil 51 into power that can be supplied to the battery 22 or the electronic device 21. For example, the power receiving circuit 52 rectifies the received power supplied from the power receiving coil 51, and converts the rectified power into a direct current. The power receiving circuit 52 is, for example, a circuit including a rectifying bridge including a plurality of diodes. In such a case, a pair of input terminals of the rectifying bridge is connected to the power reception resonance circuit including the power reception coil 51 and the resonance capacitor 55. The power receiving circuit 52 performs full-wave rectification of the received power supplied from the power receiving coil 51, and outputs DC power from the pair of output terminals.

The display unit 54 is a display device that displays various kinds of information. For example, the display unit 54 is an indicator that indicates a state of the power receiver 23. The display unit 54 switches the display in accordance with the control of the controller 53. For example, the display unit 54 switches the display color in accordance with the operation state of the power receiver 23. Further, the display unit 54 may display a message indicating the operation state.

The controller 53 controls the operation of the power receiving circuit 52 and the display unit 54. The controller 53 includes a processor and a memory. The processor executes an arithmetic processing. The processor performs various types of processing according to a program(s) stored in the memory. The memory stores data used by the processor executing the program(s). The controller 53 may be a microcomputer, an oscillation circuit, and the like. For example, the controller 53 switches the display of the display unit 54 in accordance with the state of the power receiver 23.

The power receiver 23 may have a wireless communication circuit for performing wireless communication with the corresponding power transmitter 40. For example, the wireless communication circuit is a circuit that performs wireless communication at a frequency different from the frequency of the power transmission. The controller 53 may control each unit by wirelessly communicating with the power transmitter 40 via the wireless communication circuit. The wireless communication circuit may perform wireless communication at the same frequency as the frequency of the power transmission by utilizing a known load modulation technique.

The battery 22 has the charging circuit 61 that supplies the power supplied from the power receiving circuit 52 of the power receiver 23 to the battery cell 62 as the charging power. For example, the charging circuit 61 converts the supplied power from the power receiving circuit 52 into a direct current used for charging of the battery cell 62. That is, the charging circuit 61 converts the power from the power receiving circuit 52 into the charging power of the predetermined current value having a voltage value suitable for charging the battery cell 62, and supplies the converted power to the battery cell 62.

The battery cell 62 is charged by the charging power supplied from the charging circuit 61. The battery cell 62 is connected to the electronic device 21, and supplies electric power to the electronic device 21.

Next, a positional relationship between a guide device for guiding the shopping cart 1 to the storage position, the power receiver 23 installed in the shopping cart 1, and the power transmitter 40 will be described.

Since the power transmitter 40 and the power receiver 23 wirelessly transmit power, the power transmission coil 43 and the power receiver coil 51 need to be opposed to each other such that the distance of the center positions thereof is about 10 mm to 20 mm. In the wireless power transmission, appropriate alignment of the power transmission coil 43 and the power reception coil 51 improves the power transmission efficiency. For example, the power transmission coil 43 (i.e., the power transmitting antenna) wirelessly transmits power to the power receiving coil 51 by using magnetic field coupling such as electromagnetic induction or magnetic field resonance. In wireless power transmission using such magnetic field coupling, when the position of the power transmission coil and the position of the power reception coil are not aligned with each other, power cannot be efficiently transmitted.

The wireless power supply system according to an embodiment is configured such that the power transmitter 40 transmits power to the power receiver 23 provided in the shopping cart 1 stored in the storage position. Therefore, the power transmitter 40 is disposed at the position where the power receiver 23 provided on the bottom surface of the shopping cart 1 is located when the shopping cart 1 is stored in the storage position. FIG. 5 illustrates the power transmitters 40 arranged at positions facing the power receivers 23 of the shopping carts 1 stored in the storage position. As explained above, the power receivers 23 are provided on the bottom surface of the shopping carts 1.

In the storage position, the shopping cart 1 is stored with a previously stored shopping cart in a nested manner. The first shopping cart 1 stored in the storage position engages with the recesses 33a and 34a, provided along the guide rails 33 and 34, and stops. The shopping cart 1 is not fixed in the stopped state, but is movable when pushed by strong force.

The second and subsequent shopping carts 1 engage with the second and subsequent recesses 33a and 34a on the guide rails 33 and 34. Accordingly, the interval between the front and rear shopping carts 1 becomes a predetermined interval, and the power receivers 23 of the shopping carts 1 stored in the storage position are also arranged at predetermined intervals. Correspondingly, the power transmitters 40 are arranged on the floor surface at an interval corresponding to the interval of each shopping cart stored in the storage position. Accordingly, the power transmitters 40 can transmit power toward the power receivers 23 installed on the bottom surfaces of the shopping carts 1.

That is, in each shopping cart 1 on which the battery 22 is mounted, the power receiver 23 including the power receiving coil 51 is provided on the bottom surface of each shopping cart body 11 so that the power receiving surface is parallel to the floor surface. In addition, the power transmitter 40 is installed so that the power transmission coil 43 is positioned parallel to the power receiving coil 51 of each shopping cart 1 stored in the storage position.

Figure 6:
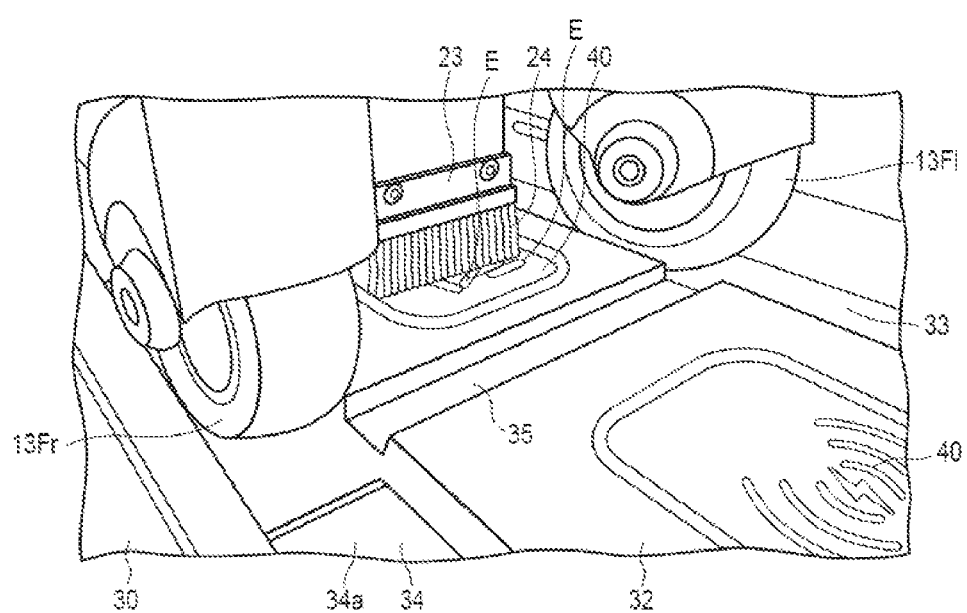
FIG. 6 is a perspective view illustrating a shopping cart in a wireless power supply system according to an embodiment.

As shown in FIGS. 5 and 6, the brush 24 is attached to the power receiver 23 and slides on the upper surface of the guide base 32. Thus, even in a case where dust E accumulates on the power transmission surface of the power transmission coil 43, the brush 24 guides the dust E to the groove 35 as shown in FIG. 5.

Figure 7:
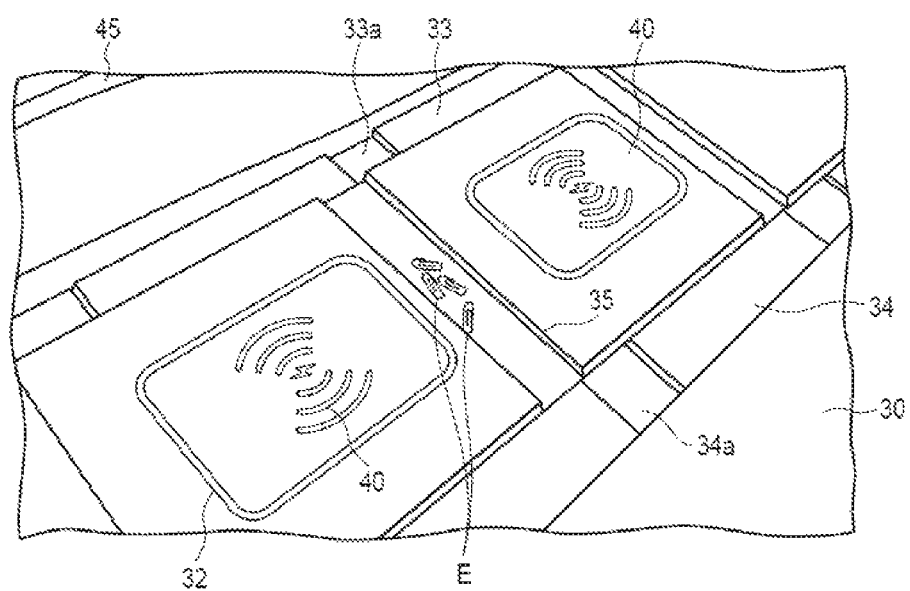
FIG. 7 is a perspective view illustrating the power transmission device in a wireless power supply system according to an embodiment.

With such a configuration, as shown in FIGS. 6 and 7, even in a case where the dust E accumulates on the power transmission surface of the power transmitter 40, the dust E is guided to the groove 35, and thus, the power supply is less likely to be performed in a state where the dust E exists between the power receiving coil 51 and the power transmission coil 43. As a result, it is possible to provide a wireless power supply system capable of safely performing power transmission by wireless without generating heat generation or the like caused by dust containing metal.

Next, a modified example of a power transmission system for a wireless power supply system will be described.

Figure 8:
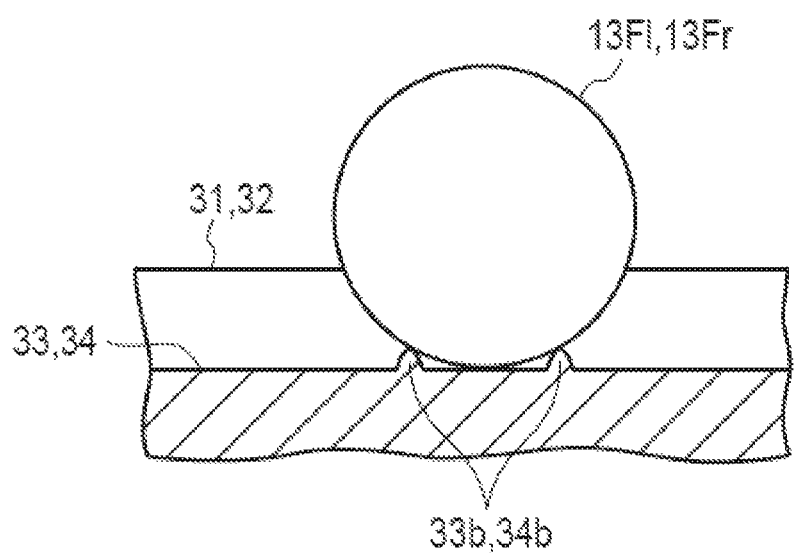
FIG. 8 is a diagram illustrating a modified example of a guide groove in a wireless power supply system according to an embodiment.

As shown in FIG. 8, as a structure for engaging the front wheels 13Fl and 13Fr, bumps 33b and 34b may be used.

Figure 9:
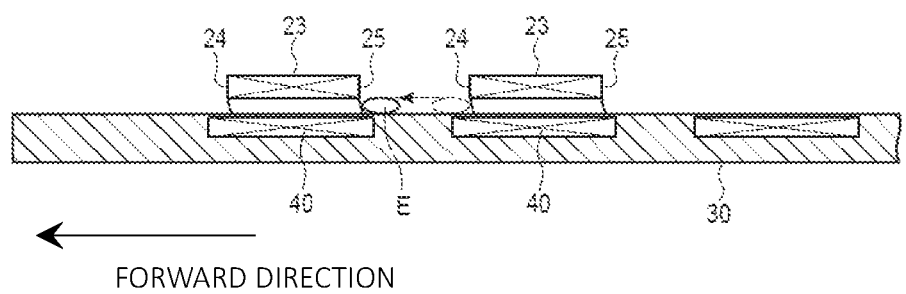
FIG. 9 is a diagram illustrating a modified example of a wireless power supply system according to an embodiment.

As a configuration for preventing the dust E from accumulating between the power receiving coil 51 and the power transmission coil 43, as shown in FIG. 9, in addition to the brush 24, a rear brush 25 may be attached to the power receiver 23. Accordingly, the rear brush 25 of the power receiver 23 can prevent the dust E from entering into a gap between the power receiving coil 51 of the preceding shopping cart 1 and the power transmission coil 43.

As described above, the wireless power supply system according to embodiments can cause the power receiver 23 and the power transmitter 40 to face each other when a user or a store clerk pushes the shopping cart 1 to the storage position without special effort to align the shopping cart 1. As a result, power is efficiently supplied from the power transmitter to the battery 22 mounted on the shopping cart 1.

If a battery 22 is not mounted on the shopping cart 1, it is possible to supply electric power directly to the electronic device 21. Since a shopping cart 1 that has been stored longest is more likely to have been fully charged, the shopping cart 1 can be taken out from the leading side in the forward direction from the storage location and used.

In the above-described embodiments, the charge level of the battery 22 may be displayed on the display unit 45 by measuring the current value of the power transmission circuit 42 of the power transmitter 40. However, the current value of the power receiving circuit 52 of the power receiver 23 may also be measured, and the value of the current value may be transmitted to the controller 44 of the power transmitter 40 through a wireless communication circuit, and the power reception amount of the battery 22 may be displayed on the display unit 45.

As a power transmission method, a magnetic field resonance method has been exemplified, but a magnetic field coupling method including any electromagnetic induction method may instead be used, and, in general, the power transmission method is not limited as long as the method is capable of providing power in a wireless manner.

In the above-described embodiments, each guide rail of the guide device forms a groove for guiding the wheel of the shopping cart 1 along the forward direction. FIG. 3 illustrates an example of a configuration in which each guide rail of the guide device includes a pair of guide members for sandwiching both side surfaces of the wheel. However, the guide device according to the embodiments does not necessarily have to be formed of a groove for guiding the wheel in this manner. For example, the guide device may be configured such that some portions of the guide rails guide only one side of the wheels rather than both.

In the above-described embodiments, the previously stored shopping cart 1 is taken out from the leading side, but in other examples a wheel stopper may be provided at the leading end of the groove formed by the guide rail 31Fr. The wheel stopper is arranged along the groove of the guide rail 31Fr, and stops the front wheel 13Fr of the shopping cart 1 that has been stored first in the storage position. The stopper can be formed as a wall surface or the like that stops the distal end portion of the cart body 11 at a predetermined position. In such a case, a shopping cart 1 which is stored last is taken out first.

The above-described embodiments are described referring to a shopping cart used in a store. However, the shopping cart may be any type of cart, e.g., a picking cart or the like used in a warehouse or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A wireless power supply system, comprising:
   a power receiving device on a bottom surface of a cart;
   a first guide rail extending along a first direction for guiding wheels of the cart;
   a plurality of power transmission devices configured to wirelessly transmit power to the power receiving device and arranged along the first guide rail at predetermined intervals;
   a guide surface extending along the first direction between the first guide rail and the plurality of power transmission devices and in which a plurality of recesses is arranged at the predetermined intervals along the first direction such that one of the plurality of power transmission devices faces the power receiving device when a wheel of the cart is in one of the recesses;
   a groove between adjacent ones of the plurality of power transmission devices and extending perpendicular to the first direction; and
   a first brush arranged on the bottom surface of the cart so as to contact an upper surface of each of the plurality of power transmission devices but not a bottom surface of the groove when the cart is moved along the first guide rail.

2. The wireless power supply system according to claim 1, further comprising:
   a second guide rail parallel to the first guide rail, wherein the plurality of power transmission devices are between the first and second guide rails.

3. The wireless power supply system according to claim 1, further comprising:
   a second brush on the bottom surface of the cart, the second brush spaced from the first brush in the first direction of the cart.

4. The wireless power supply system according to claim 1, wherein the plurality of power transmission devices wirelessly transmit power by magnetic field coupling.

5. The wireless power supply system according to claim 1, further comprising:
   a battery on the cart, wherein
   the power receiving device is configured to charge the battery.

6. The wireless power supply system according to claim 5, further comprising:
   a display device connected to the battery.

7. The wireless power supply system according to claim 1, wherein the first guide rail is configured to permit a plurality of carts to be arranged in a nested manner.

8. The wireless power supply system according to claim 1, wherein each of the plurality of power transmission devices includes a display for indicating an operation status of said each of the plurality of power transmission devices.

9. The wireless power supply system according to claim 1, wherein the power receiving device includes a display for indicating an operation status of the power receiving device.

10. A wireless power supply system, comprising:
    a first guide rail extending along a first direction for guiding wheels of carts;
    a plurality of power transmission devices, each configured to wirelessly transmit power to power receiving devices on the carts, the plurality of power transmission devices being spaced along the guide rail at predetermined intervals;
    a guide surface extending along the first direction between the first guide rail and the plurality of power transmission devices and in which pairs of bumps are arranged at the predetermined intervals along the first direction such that one of the power transmission devices faces the power receiving device of a cart when a wheel of the cart fits into a space between one of the pairs of bumps; and a groove between adjacent ones of the plurality of power transmission devices.

11. The wireless power supply system according to claim 10, further comprising:
a second guide rail parallel to the first guide rail, wherein the power transmission devices are between the first and second guide rails.

12. The wireless power supply system according to claim 10, wherein the plurality of power transmission devices wirelessly transmit power by magnetic field coupling.

13. A wireless power transmission device, comprising:
a first guide rail extending along a first direction and configured to guide wheels of a cart;
a plurality of power transmission devices configured to wirelessly transmit power to a power receiving device of the cart, the plurality of power transmission devices spaced at predetermined intervals along the first direction;
a guide surface extending along the first direction between the first guide rail and the plurality of power transmission devices and in which a plurality of recesses is arranged at the predetermined intervals along the first direction and each of the power transmission devices is positioned to face the power receiving device of the cart when a wheel of the cart is in one of the recesses; and
a groove between adjacent ones of the plurality of power transmission devices, the groove extending perpendicular to the first direction, wherein
an upper surface of each of the plurality of power transmission devices is higher than a bottom surface of the groove.

14. The wireless power transmission device according to claim 13, further comprising:
a second guide rail parallel to the first guide rail, wherein the plurality of power transmission devices are between the first and second guide rails.

15. The wireless power transmission device according to claim 13, wherein the plurality of power transmission devices wirelessly transmit power by magnetic field coupling.

16. The wireless power transmission device according to claim 13, wherein each of the plurality of power transmission devices includes a display for indicating an operation status of said each of the plurality of power transmission devices.

* * * * *